Dec. 20, 1960 C. A. SERENO 2,964,815
QUICK RELEASE BUCKLE
Filed Nov. 23, 1955 2 Sheets-Sheet 1
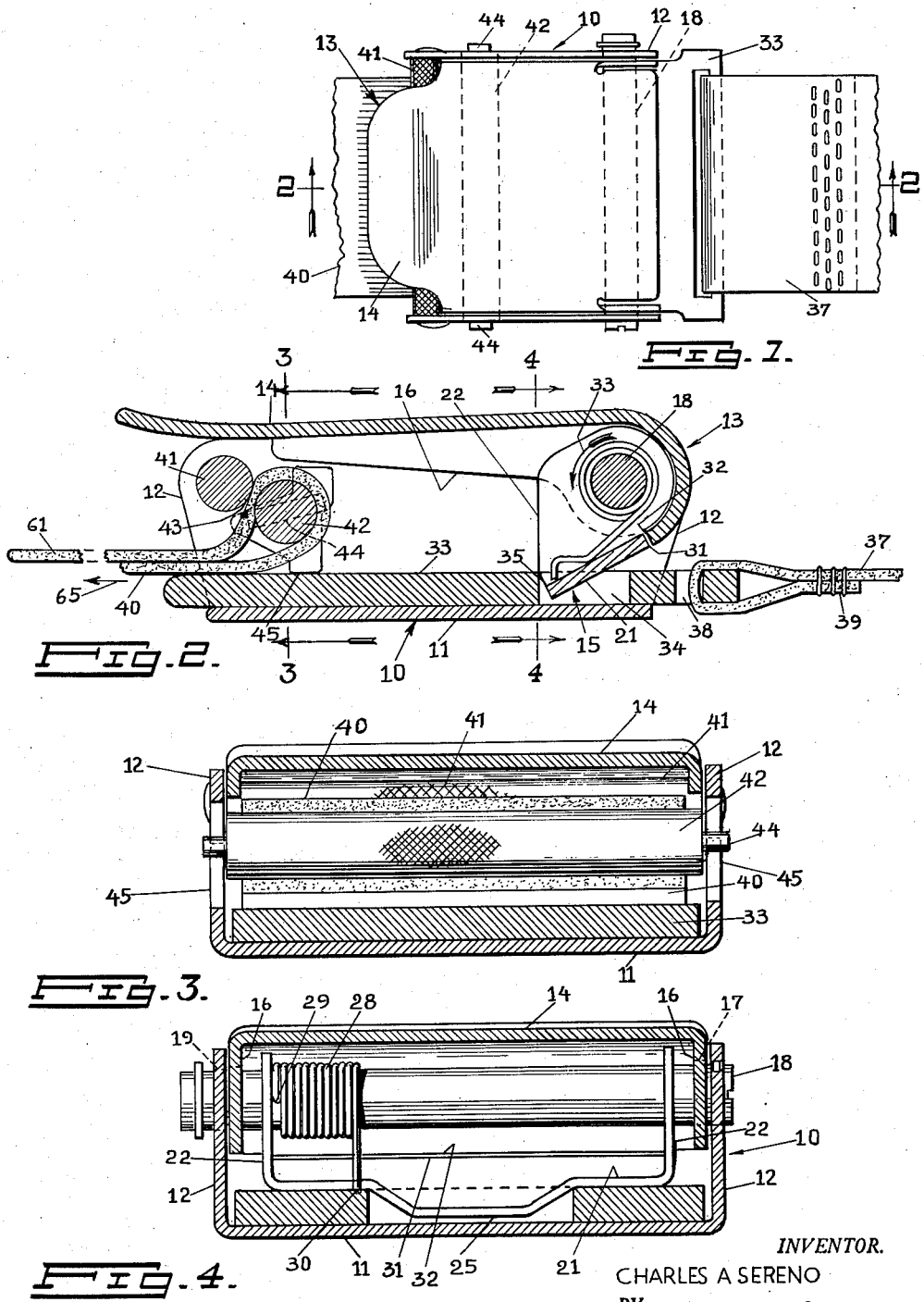
INVENTOR.
CHARLES A SERENO
BY
ATTORNEYS Dec. 20, 1960 C. A. SERENO 2,964,815
QUICK RELEASE BUCKLE
Filed Nov. 23, 1955 2 Sheets-Sheet 2

INVENTOR.
CHARLES A. SERENO.
BY Clark x Ott
ATTORNEYS.

United States Patent Office 2,964,815
Patented Dec. 20, 1960

2,964,815

QUICK RELEASE BUCKLE

Charles A. Sereno, Pines Lake, N.J., assignor, by mesne assignments, to Air Associates, Inc., Teterboro, N.J., a corporation of Delaware Filed Nov. 23, 1955, Ser. No. 548,616

5 Claims. (Cl. 24—75)

This invention relates to a buckle for releasably connecting the ends of a belt and the like.

An object of the invention is to provide a buckle for connecting the ends of a seat belt in an aircraft or other fast moving craft or vehicle.

Another object of the invention is to provide a belt buckle in which one end of the belt is affixed to a part thereof and the other end is adapted to be releasably connected with the buckle to permit of the quick release thereof.

The invention primarily comprehends a seat belt buckle for use in securing an occupant in an aircraft or fast moving vehicle which permits of the convenient adjustment of one of the belt ends with reference to the buckle in either direction to decrease or increase the length of the belt for accommodating the particular occupant of the seat and which is constructed to provide quick locking action as well as quick release.

Still another object of the invention is to provide a buckle which is held in snubbing locking action by the tension of the belt.

Another object of the invention is to provide a buckle in which one of the belt ends has locking action between a fixed member and a movable member having movement toward and away from the fixed member, the movable member being moved by a slide plate into relation with the fixed member to permit of locking action of the belt end between the fixed and movable members by a pull on the belt end.

Still another object of the invention is to provide a buckle in which the movable member is held against turning movement when the slide plate is removed.

Still another object of the invention is to provide a buckle in which the slide plate is attached to one of the belt ends and is adapted to be engaged by a pivotal latch member for retaining the slide plate in fixed position.

In the drawings:

Fig. 1 is a top plan view of a buckle construction in accordance with the invention and showing fragmentary portions of the ends of a belt.

Fig. 2 is an enlarged longitudinal vertical sectional view taken approximately on line 2—2 of Fig. 1.

Fig. 3 is a cross-sectional view taken approximately on line 3—3 of Fig. 2.

Fig. 4 is a similar view taken approximately on line 4—4 of Fig. 2.

Figure 5:
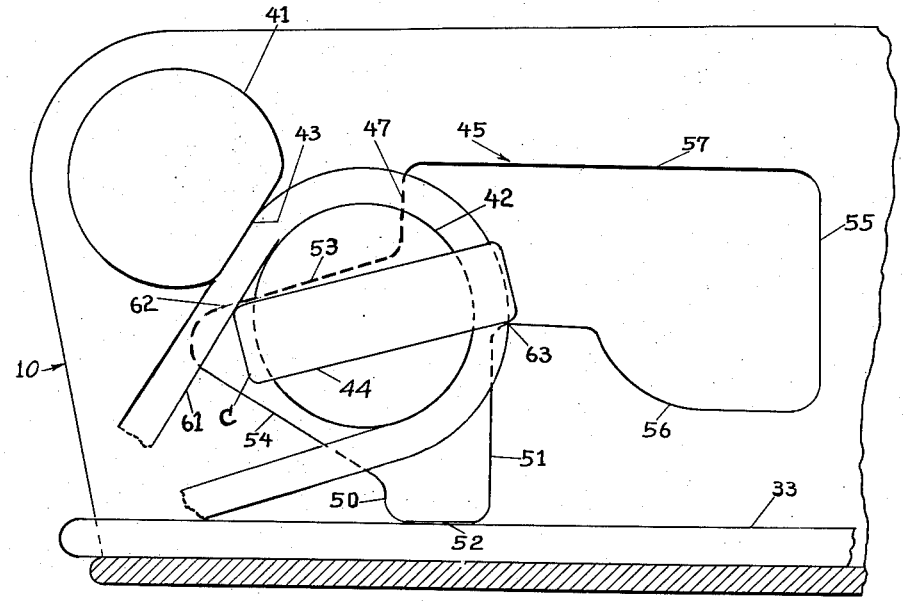
Fig. 5 is a fragmentary view of one end of the frame showing a modified form of the fixed member and with the movable member in locking position.

The invention is illustrated in its application to a buckle adapted to connect the ends of a seat belt for securing the occupant in a seat in an aircraft or other fast moving craft or vehicle. The seat belt ends are affixed to opposite sides of the passenger seat with one of the ends affixed to a part of the buckle while the other end is releasably connected with the buckle.

The buckle includes a frame 10 of U shaped formation in cross section having a bottom wall 11 and opposite side walls 12. Pivotally connected with the frame 10 is a latch member 13 composed of a handle section 14 and a latching section 15. The handle section 14 is provided with opposite side flanges 16 having aligned openings 17 through which extends a bearing shaft 18 with the ends secured in openings 19 in the side walls 12 of the frame. The latching section 15 includes a bottom wall 21 and opposite upstanding side flanges 22 which are apertured to receive the shaft 18 and are located inwardly of the side flanges 16 of the section 14. The bottom wall 21 is formed with a medial depressed portion 25 for a purpose to be hereinafter explained. A torsion spring 28 is loosely engaged on the shaft 18 with one end of the spring affixed to the shaft as at 29 and the other end affixed to the section 15 as at 30. The rearmost edge 31 of the latching section 15 is spaced from the edge 32 of the arcuate portion of the handle section 14 when the latching section 15 is in latched engagement with the slide plate 33. The sections are tensioned by the spring 28 about the shaft 18 in a counterclockwise direction as viewed in Fig. 2 of the dradwings and as indicated by the arrow 33.

A slide plate 33 having a rectangular opening 34 is slideable on the bottom wall 11 of the frame 10 into latched engagement with the latching section 15 to retain the slide plate in position and prevent unintentional retraction thereof. On inserting the slide plate into position the forward end thereof swings the latching section 15 upwardly against the tension of the spring 28 and when the slide plate is fully inserted, the latching section is swung downwardly by the spring 28 to dispose the depressed portion 25 of the bottom wall 21 in the opening 34 with the forward edge of the depressed portion abutting against the forward wall 35 of the opening.

The slide plate is attached to the seat belt end 37 which is looped through the opening 38 and the doubled-over end secured to the belt end by stitching 39 or equivalent fastening means. The other seat belt end 40 is releasably connected with the buckle by a locking action between a fixed member 41 and a member 42 having limited movement toward and away from the fixed member 41. The fixed member 41 is secured in fixed relation between the side walls 12 of the frame 10 in parallel relation with the movable member 42 and in spaced relation above the bottom wall 11 of the frame. The portion 43 of the periphery of the fixed member 41 which confronts the movable member 42 may be of arcuate or curvilinear formation as shown in section in Fig. 2 of the drawings or the same may be of plane or flat formation as shown in Fig. 5 of the drawings. The movable member 42 is of roller formation and is provided with projecting ends 44 of rectangular formation in section which are mounted in aligned openings 45 in the side walls 12 of the frame 10 to permit of upward movement of the movable member with the insertion of the slide plate 33 and movement toward the fixed member 41 by a pull on the belt end 40 which tightens the portion of the belt between the movable member 42 and the fixed member 41 to effect a locking action of the belt therebetween.

Figure 6:
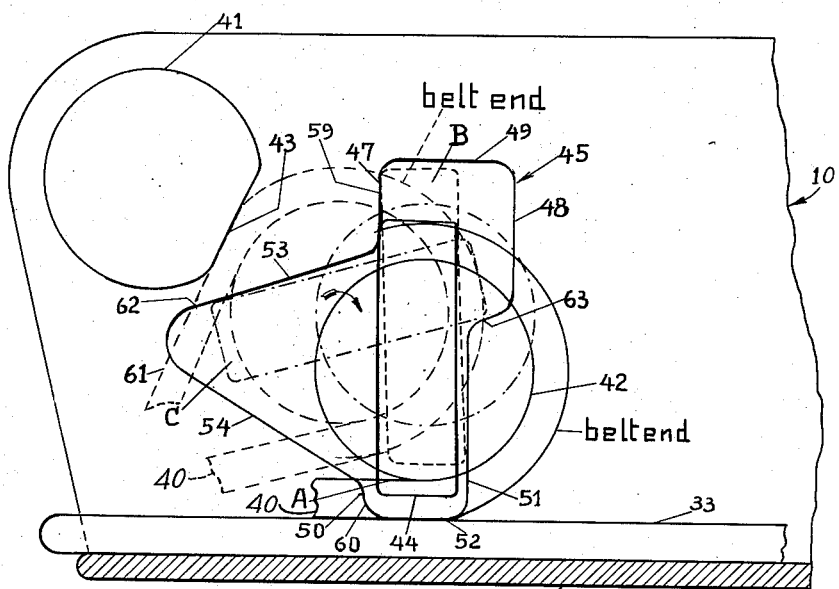
Fig. 6 is a fragmentary view of a portion of the frame showing the formation of the opening in the side walls thereof and several relative positions of the movable member.

The ends 44 of the movable member 42 are relatively narrower in one cross-sectional dimension than the diameter of the movable member and are relatively longer in the other cross-sectional dimension than the diameter of said movable member. The openings 45 are of such formation that the said ends 44 have several relative positions therein as indicated by the reference characters $A_1$ B and C in Fig. 6 of the drawings. As illustrated, the upper portion of the opening in one of the side walls 12 of the frame is of general rectangular formation which portion is defined by the parallel side walls 47 and 48 and the top wall 49, while the lower portion thereof is also of general rectangular formation and is defined by opposite side walls 50 and 51 and a bottom wall 52. The forward portion thereof is of triangular formation and is bounded by the walls 53 and 54 which merge with the walls 47 and 50 and subtend an acute angle. In the other side wall 12 the opening 45 is of similar formation with the exception that the upper portion thereof is widened and extends from the side wall 47 to the side wall 55 and from the bottom wall 56 to the top wall 57. This extension of the opening is provided to permit of the insertion of the movable member 42 in operative position in the openings and the removal of the same therefrom.

When the slide plate 33 is removed the belt end 40 can be adjusted in either direction and the movable member 42 will then assume its lowermost position with the ends 44 disposed in position A. In this position the ends 44 engage against the walls at points 59 and 60 to prevent turning of the movable member in either direction during the belt adjusting operation. When the slide plate 33 is inserted in the frame, the movable member 42 is raised to thereby dispose the ends 44 in position B to permit of turning movement. In this position a pull on the belt end 40 will move the movable member 42 into close relation with the fixed member to thereby effect a locking action of the belt therebetween. When this occurs, the ends 44 are turned in a clock-wise direction approaching the position C and in the event that the pull on the belt end 40 is sufficient to tightly compress the belt between the fixed and movable members, the ends 44 will engage against the wall 53 at the point 62 and against the wall 56 at the point 63. When the pull on the belt end 40 is relieved, the free end 61 of the belt can be pulled to effect a shortening of the belt and when this occurs, the ends 44 of the movable member again assume the position B. It is to be understood that the belt end 40 is free to move in either direction when the slide is removed from the frame and when inserted therein the free end 61 can be pulled to effect shortening of the belt and a pull on the belt end 40 in the direction of the arrow 65 produces a snubbing locking action of the portion of the belt between the fixed and movable members.

Preferably the periphery of the movable member 42 and the portion of the periphery of the fixed member 41 engaged by the belt end 40 are knurled to provide frictional gripping action.

While the preferred form of the invention is illustrated in the drawings and described in the specification herein, it is to be understood that the same is not so limited but shall cover and include any and all modifications and forms of the invention which fall within the purview thereof.

What is claimed is:

1. In a device of the character described, a frame including a bottom wall and opposite side walls, a slide plate slidable on said bottom wall, a latch member carried by said frame and having latching engagement with said slide plate, a first belt end affixed to said slide plate, a fixed member overlying said bottom wall and secured at its ends to said side walls, a roller member disposed adjacent to and in parallel relation with said fixed member and overlying said slide plate when said slide plate is in latched engagement, and said roller member having end extensions with side face portions, a second belt end adapted to engage about said roller member and between the same and said fixed member, said side walls having openings formed therethrough in which said extensions are disposed for sliding and turning movement through a partial revolution, each of said openings being shaped to provide spaced internal shoulders against which said side face portions of said extensions are positioned to retain said roller member against turning movement when said slide plate is moved from beneath said roller member, and said extensions being moved out of engagement with one of said internal shoulders of each side wall when said slide plate is moved into position beneath said roller member and said second belt end to thereby free said extensions for turning movement of said roller member through a partial revolution by a pull on said second belt end to clamp said second belt end between said fixed and roller members.

2. In a device of the character described, a frame including a bottom wall and opposite side walls, a slide plate slidable on said bottom wall, a latch member carried by said frame and having latching engagement with said slide plate, a first belt end affixed to said slide plate, a fixed member overlying said bottom wall and secured at its ends to said side walls, a roller member disposed adjacent to and in parallel relation with said fixed member and overlying said slide plate when said slide plate is in latched engagement, and said roller member having end extensions with side face portions, a second belt end adapted to engage about said roller member and between the same and said fixed member, said side walls having openings formed therethrough in which said extensions are disposed for sliding and turning movement through a partial revolution, each of said openings being shaped to provide a pair of spaced internal shoulders against which certain of said face portions of said extensions are positioned to retain said roller member against turning movement when said slide plate is moved from beneath said roller member, and each of said open portions providing a second pair of spaced internal shoulders against which certain of said side faces of said extensions are positioned to limit the turning of said roller member through a partial revolution toward said fixed member, and said extensions being moved out of engagement with said first pair of shoulders when said slide plate is moved into position beneath said roller member to engage and lift the same and said second belt end to thereby free said extensions for turning movement of said roller member through a partial revolution by a pull on said second belt end to clamp said second belt end between said fixed and roller members.

3. In a device of the character described, a frame including a bottom wall and opposite side walls, a slide plate slidable on said bottom wall, a latch member carried by said frame and having latching engagement with said slide plate, a first belt end affixed to said slide plate, a fixed member overlying said bottom wall and secured at its ends to said side walls, a roller member disposed adjacent to and in parallel relation with said fixed member and overlying said slide plate when said slide plate is in latched engagement, said roller member having end extensions, a second belt end adapted to engage about said roller member and between the same and said fixed member, said side walls having openings formed therethrough in which said extensions are disposed for sliding and turning movement of said roller member through a partial revolution, said openings being shaped to retain said roller member against turning when said slide plate is moved from beneath said roller member, and said extensions being free for turning movement of said roller member toward said fixed member by a pull on said second belt end when said slide plate is moved into position beneath said roller member and said second belt end to clamp said second belt end between said fixed and roller members.

4. In a device of the character described, a frame including a bottom wall and opposite side walls, a slide plate slidable on said bottom wall, a latch member carried by said frame and having latching engagement with said slide plate, a first belt end affixed to said slide plate, a fixed member overlying said bottom wall and secured at its ends to said side walls, a roller member disposed adjacent to and in parallel relation with said fixed member and overlying said slide plate when said slide plate is in latched engagement and said roller member having end extensions each formed with oppositely disposed substantially parallel side faces, a second belt and adapted to engage about said roller member and between the same and said fixed member, said side walls having openings formed therethrough in which said extensions are disposed for sliding and turning movement of said roller member through a partial revolution, each of said openings being shaped to provide a pair of spaced internal shoulders against which one of the side faces of each of said extensions are positioned to retain said roller member against turning movement when said slide plate is moved from beneath said roller member, each of said open portions having a second pair of spaced internal shoulders against which opposite side faces of each of said extensions are positioned to limit the turning of said roller member through a partial revolution toward said fixed member, and said extensions being moved out of engagement with said first pair of shoulders when said slide plate is moved into position beneath said roller member and said second belt end to thereby free said extensions for turning movement of said roller member through a partial revolution by a pull on said second belt end to clamp said second belt end between said fixed and roller members.

5. In a device of the character described, a frame including a bottom wall and opposite side walls, a slide plate slidable on said bottom wall, a latch member carried by said frame and having latching engagement with said slide plate, a first belt end affixed to said slide plate, a fixed member overlying said bottom wall and secured at its ends to said side walls, a movable member disposed adjacent to and in parallel relation with said fixed member and overlying said slide plate when said slide plate is in latched engagement, said movable member having end extensions, a second belt end adapted to engage about said movable member and between the same and said fixed member, said side walls having openings formed therethrough in which said extensions are disposed for turning movement, each of said openings being shaped to provide three recesses, the first of said recesses being disposed adjacent said bottom wall, the second of said recesses being disposed on the side of said first recess opposite said bottom wall, the third of said recesses being disposed between said first and second recesses and extending toward said fixed member, said first and second recesses being defined by abutment shoulders on the sides thereof adjacent said fixed member, said abutment shoulders being spaced apart by said third recess, said extensions and movable member being so proportioned and said first recess being so positioned relative to said bottom wall and fixed member that when said extensions are fully seated in said first recesses and in contact with said abutment shoulders of said first and second recesses, said movable member will be spaced from said bottom wall a distance less than the sum of the thicknesses of said second belt end and slide plate and from said fixed member a distance substantially greater than the thickness of said second belt end, said abutment shoulder of said first recess extending away from said bottom wall a distance such that when said movable member is spaced from said bottom wall a distance equal to at least the sum of the thicknesses of said second belt end and slide plate said extensions will be displaced from said first recess and be free to swing into said third recess about a fulcrum provided by said abutment shoulder of said second recess to permit said movable member to approach said fixed member to grip said second belt end between said fixed and movable members.

References Cited in the file of this patent

UNITED STATES PATENTS

| | | |
|---|---|---|
| 1,234,818 | Sturrock | July 31, 1917 |
| 2,437,729 | Easter | Mar. 16, 1948 |
| 2,710,999 | Davis | June 21, 1955 |
| 2,743,497 | Davis | May 1, 1956 |
| 2,803,864 | Bishaf | Aug. 27, 1957 |